(12) United States Patent
Shiraishi

(10) Patent No.: US 6,940,791 B2
(45) Date of Patent: Sep. 6, 2005

(54) DATA RECORDING CONTROLLER

(75) Inventor: Takuya Shiraishi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 276 days.

(21) Appl. No.: 10/402,388

(22) Filed: Mar. 28, 2003

(65) Prior Publication Data

US 2004/0022144 A1 Feb. 5, 2004

(30) Foreign Application Priority Data

Mar. 29, 2002 (JP) ........................................ 2002-095087

(51) Int. Cl.⁷ ................................................ G11B 7/00
(52) U.S. Cl. .................................... 369/47.3; 369/47.42
(58) Field of Search ............................. 369/47.1, 47.34, 369/47.42, 47.3

(56) References Cited

FOREIGN PATENT DOCUMENTS

JP          5-325192      * 10/1993    ................ 369/47.1

* cited by examiner

*Primary Examiner*—Nabil Hindi
(74) *Attorney, Agent, or Firm*—Fish & Richardson P.C.

(57) ABSTRACT

A data recording controller for controlling recording operation of plural pieces of modulated data recorded on a disc medium in units of blocks. The controller includes a modulation circuit for modulating data with a conversion parameter to generate modulated data while updating the conversion parameter for each piece of data. A control circuit stops the recording operation part way through a block in response to a record stop command and starts the recording operation from a record stop position in response to a record start command. A parameter register stores the conversion parameter of the modulated data at the time of stopping the recording operation. The modulation circuit starts modulating data with the conversion parameter stored in the parameter register as an initial value when the recording operation is started. Thus, the recording of data is smoothly restarted without using a link section.

17 Claims, 5 Drawing Sheets

DATA RECORDING CONTROLLER

CROSS-REFERENCE TO RELATED APPLICATIONS

This application is based upon and claims the benefit of priority from prior Japanese Patent Application No. 2002-095087, filed on Mar. 29, 2002, the entire contents of which are incorporated herein by reference.

BACKGROUND OF THE INVENTION

The present invention relates to a data recording controller, and more particularly, to a data recording controller for controlling recording operations in a data recorder that records data to a recording medium.

Data subjected to recording (original data) is normally not directly recorded on a recording medium. The original data undergoes a conversion, such as modulation. The converted data (write or record data) is then recorded on the recording medium. The conversion of the original data is performed to increase the recording density and to guarantee reliability.

For example, a recorder (DVD recorder) using a digital versatile disc (DVD), which is one type of optical disc, as the recording medium performs 8–16 modulation of the original data, to which a predetermined error correction code is added. Further, the modulated data undergoes non return to zero inverted (NRZI) conversion to generate write data.

The 8–16 modulation modulates 8 bits of data to 16 bits of data based on a predetermined conversion table. In the 16 bits of 8–16 converted data, there are two or more and ten or less zeros "0" between a pair of ones "1". In accordance with a predetermined regularity, the NRZI conversion converts a string of data to data that is easily recorded. The 8–16 conversion and NRZI conversion increases the redundancy of the DVD write data compared to the original data. However, this facilitates determination of the appropriateness of the write data and the recording of the write data. Accordingly, data is recorded in a highly reliable manner.

In 8–16 modulation, multiple conversion tables having a plurality of 16 bit data conversion patterns for a single piece of 8 bit data are used. One of the conversion patterns is selected based on a conversion number assigned to the data modulated before the data that is subject to modulation. The conversion number is set by referring to a bit array of the data modulated before the modulation subject data.

In NRZI conversion, the modulated data depends on the value of the data immediately before the conversion. Accordingly, when converting original data to write data, the DVD recorder requires a conversion number and a conversion parameter for the data immediately before the conversion. Thus, the DVD recorder has a data recording controller that holds the conversion parameter whenever converting original data to use the parameter in the next conversion of original data. By sequentially providing such conversion parameters, the original data is continuously converted to write data while maintaining conversion regularity.

When recording new write data subsequent to write data that is already recorded on the recording medium, the continuity of the conversion parameters is lost at the point in which the two portions of write data are connected. Thus, in the prior art, when performing the next recording operation after the preceding recording operation, to prevent the irregularity of the conversion parameters from affecting the continuity of the write data, the termination of the recording operation after the writing of the write data is completed at a predetermined block position on the recording medium has been proposed. When doing so, dummy data (link data) is written after the final write data until reaching a predetermined block position in which the writing should be completed.

The recording (writing) operation of the DVD recorder will now be discussed.

In a DVD, a data recording position on the disc is managed using a series of sector numbers, the head address of which is 30000H. The "H" represents a hexadecimal. Data is recorded in sector units in correspondence with the address. One sector includes 2,048 bytes of data and a header added to the data. A single block (data block) includes 16 consecutive sectors and an inner parity and other parity, which are added to each of the 16 sectors. The outer parities included in a block are rearranged for each sector and recorded in a sector unit, which includes the inner parity and the outer parity.

In each recording sector, a synch code is added to the head of every 92 bytes of data. Then, the data is modulated to generate a physical selector corresponding to the address which head is 30000H. A unit of 92 bytes of data to which a synch code is added is referred to as a frame. A single physical sector includes 26 frames.

Figure 1:
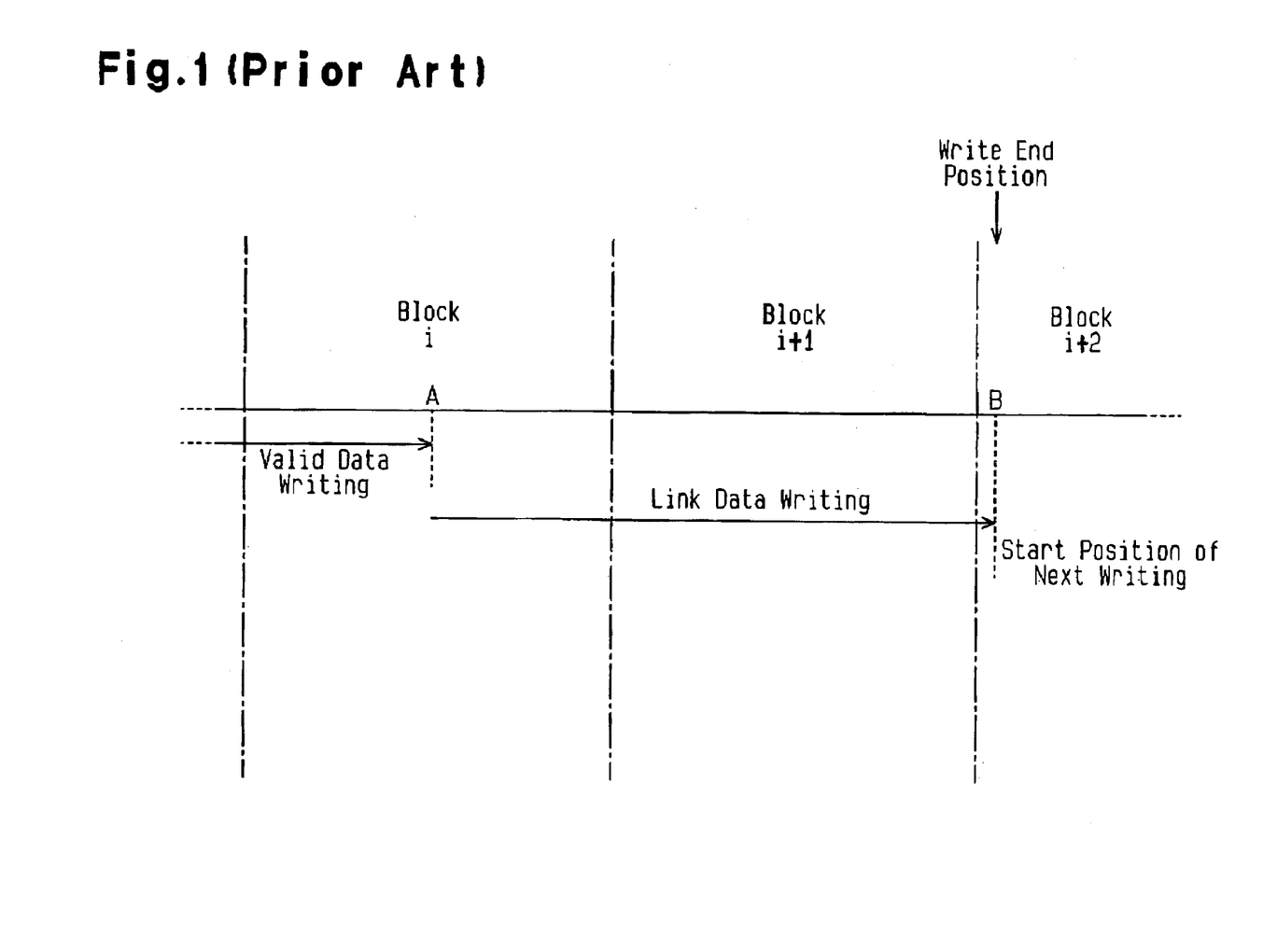
FIG. 1 is a diagram illustrating the writing of data in a prior art DVD recorder.

When completing the recording of DVD format data and restarting the recording of the DVD format data, the DVD recorder operates as shown in FIG. 1.

When recording data, a valid data write process and a link data write process are performed. Valid data refers to the write data generated by performing 8–16 modulation or NRZI modulation on the original data. In FIG. 1, the writing of the valid data temporarily ends at an intermediate position A, which is the ith block. When the writing of valid data is interrupted in such manner, link data (e.g., all "0") is written from the write interruption position A to a predetermined position B. That is, link data is written to the section from the write interruption position A at the ith block to a write position B of the (i+2)th block, which is subsequent to an (i+1)th block. The writing (adding) of the next data starts from the write position B. In this manner, link data is added to write data in units of blocks Thus, even when the conversion is performed in an irregular manner, the additional recording of data is enabled without being affected by the irregularity. However, the writing of the link data when writing is interrupted decreases the storage efficiency of the recording section in the disc.

SUMMARY OF THE INVENTION

In a first aspect of the present invention, there is provided a data recording controller for controlling recording operation of plural pieces of modulated data recorded on a disc medium in units of blocks. The data recording controller includes a modulation circuit for modulating the data with a conversion parameter to generate modulated data while updating the conversion parameter for each piece of data. A control circuit is connected to the modulation circuit to stop the recording operation part way through a block in response to a record stop command and start the recording operation from a record stop position in response to a record start command. A parameter register is connected to the modulation circuit to store the conversion parameter of the modulated data at the time of stopping of recording operation. The modulation circuit starts modulating data with the conversion parameter stored in the parameter register as an initial value when the recording operation is started.

In a second aspect of the present invention, there is provided a data recording controller for controlling recording operation of plural pieces of modulated data recorded on a disc medium in units of blocks. The data recording controller includes a modulation circuit for modulating the data with a conversion parameter to generate modulated data while updating the conversion parameter for each piece of data. A control circuit is connected to the modulation circuit to stop the recording operation part way through a block in response to a record stop command and start the recording operation from a record stop position in response to a record start command. A parameter register is connected to the modulation circuit to store the conversion parameter of the modulated data at the time of stopping the recording operation. An output circuit is connected to the modulation circuit to receive the modulated data from the modulation circuit and output the modulated data to an external unit in response to a start trigger for data recording. The modulation circuit receives the conversion parameter from the parameter register and starts modulating data with the conversion parameter as an initial value in response to the start trigger. The control circuit includes a recording position register for storing the record stop position. A counter is connected to the modulation circuit to count the modulated data and generating a count value. A trigger generation circuit is connected to the recording position register, the counter, and the modulation circuit to compare the count value and the record stop position when starting recording operation and generate the start trigger based on the comparison. The conversion parameter of the modulated data stored in the parameter register is read when the recording operation is stopped. The read conversion parameter is stored in the parameter register again when the recording operation is started.

In a third aspect of the present invention, there is provided a data recording controller for controlling recording operation of plural pieces of modulated data recorded on a disc medium in units of blocks. The data recording controller includes a modulation circuit for modulating the data with a conversion parameter to generate modulated data while updating the conversion parameter for each piece of data. A parameter register is connected to the modulation circuit to store the conversion parameter of the modulated data at the time of stopping the recording operation. A recording position register stores a record stop position of the middle of the block where the recording operation is stopped. A counter is connected to the modulation circuit to count the modulated data and generating a count value. A trigger generation circuit is connected to the recording position register, the counter, and the modulation circuit to compare the count value and the record stop position and generate a stop trigger for data recording based on the comparison. The modulation circuit stores a conversion parameter in the parameter register in response to the stop trigger.

In a fourth aspect of the present invention, there is provided a method for controlling recording operation of plural pieces of modulated data recorded on a disc medium in units of blocks. The method includes modulating data with a conversion parameter to generate modulated data while updating the conversion parameter for each piece of data, stopping recording operation part way through a block in response to a record stop command, storing the conversion parameter of the modulated data at the time of stopping the recording operation, starting the modulation of the data with the stored conversion parameter as an initial value in response to a record start command, and starting the recording operation from a record stop position.

In a fifth aspect of the present invention, there is provided a method for controlling recording operation of plural pieces of modulated data recorded on a disc medium in units of blocks. The method includes modulating data with a conversion parameter to generate modulated data while updating the conversion parameter for each piece of data, counting the modulated data to generate a count value, storing a record stop position part way through a block, comparing the count value and the record stop position to generate a stop trigger of the recording operation based on the comparison, and storing the conversion parameter of the modulated data at the time of stopping the recording operation in response to the stop trigger.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3(a) to 3(l) are timing charts illustrating a write ending operation performed by the data recording controller;

FIGS. 4(a) to 4(l) are timing charts illustrating a write starting operation performed by the data recording controller of FIG. 2.

DETAILED DESCRIPTION OF THE PREFERRED EMBODIMENTS

In the drawings, like numerals are used for like elements throughout.

A data recording controller 100 according to a preferred embodiment of the present invention will now be discussed with reference to FIGS. 2 to 4. The data recording controller 100 of the preferred embodiment is employed in a DVD recorder, which uses a DVD-recordable (DVD-R) disc.

The DVD recorder, which uses a DVD-R disc as a recording medium, generates write data (record data) that is suitable for recording by modulating and converting original data. In such a case, address information, which indicates the recording position of data on the disc, is recorded as a land prepit (LPP) when manufacturing a disc. The DVD recorder decodes an address signal, which is obtained from the LPP, with a decoder and recognizes the recording position from the obtained address information.

The conversion of original data to write data includes 8–16 modulation and NRZI modulation. The data conversion requires several conversion parameters that are determined from the results of conversions performed immediately before the present data conversion.

The 8–16 modulation modulates 8 bits of data to 16 bits of data based on a predetermined conversion table. The conversion table designates 16 bits of data corresponding to 8 bits of data. The conversion of a series of 8 bits of data is performed continuously by referring to a conversion number to designate the conversion table that is to be used next. In such a case, more than one conversion table may be designated as the next table. Thus, there may be more than one piece of 16 bit data subsequent to conversion. In this manner, several pieces of converted 16 bit data are held for a predetermined period as conversion data candidates. In accordance with a predetermined regularity, one of the conversion data candidates are selected and the other conversion data candidates are cleared. In NRZI conversion, the conversion result is determined in accordance with whether the value of the data immediately before conversion is "0" or "1". Accordingly, when performing the next recording operation after the preceding recording operation, the conversion parameter must be provided as an initial value to the DVD recorder to perform 8–16 modulation and NRZI modulation in accordance with the regularity of conversions.

In the preferred embodiment, when adding write data after a previously written data recording section, the previously written data does not include link data. Further, valid data is written to an arbitrary position, which includes the middle of a block. In other words, the next recording operation is performed in a continuous manner from the previous recording operation without a link section.

Figure 2:
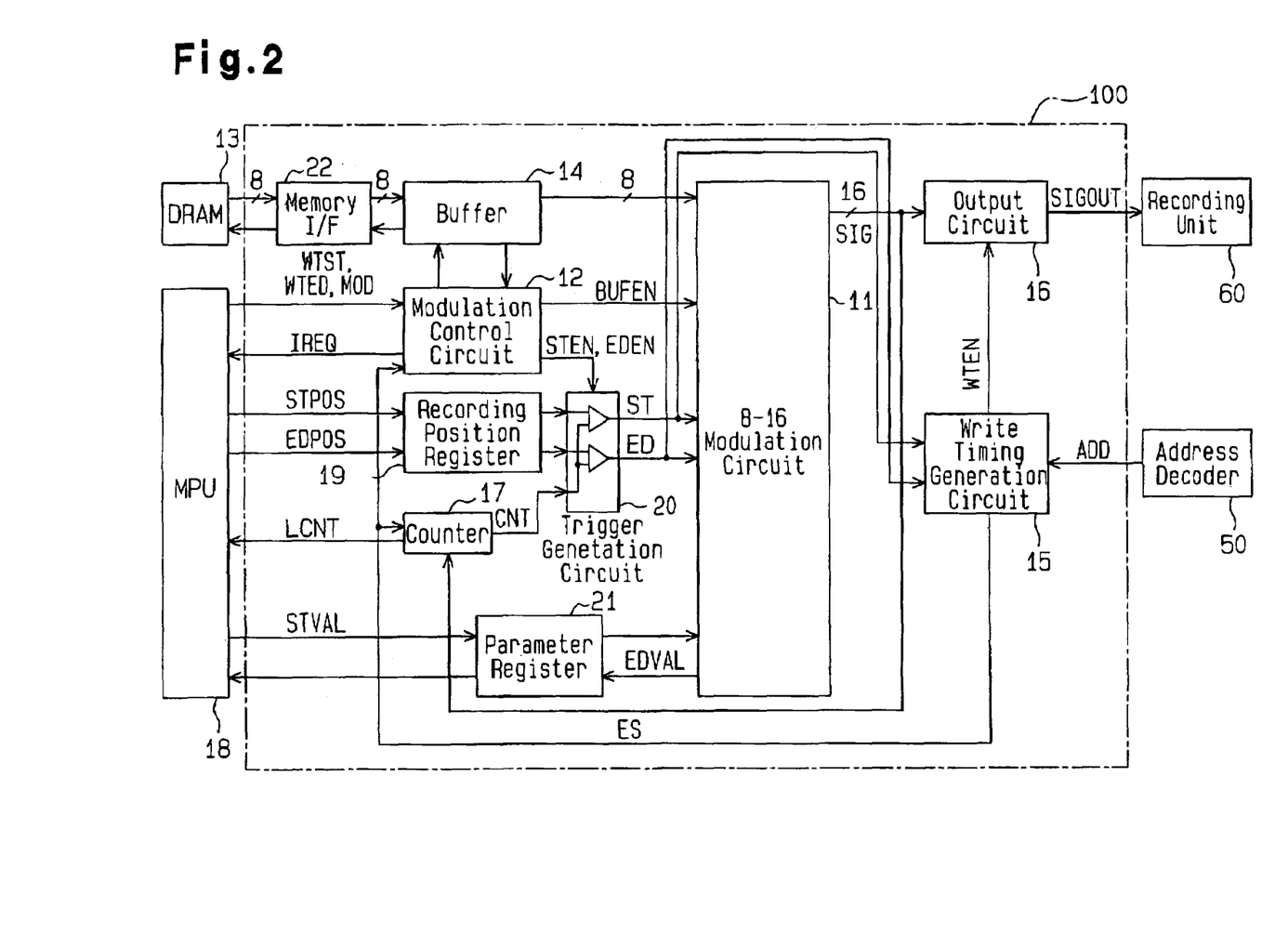
FIG. 2 is a schematic block diagram of a data recording controller according to a preferred embodiment of the present invention.

With reference to FIG. 2, the data recording controller 100 includes an 8–16 modulation circuit 11, a modulation control circuit 12, a memory interface (I/F) 22, a buffer 14, a write timing generation circuit 15, an output circuit 16, a counter 17, a recording position register 19, a trigger generation circuit 20, and a parameter register 21. The modulation control circuit 12, the recording position register 19, and the counter 17 function as a control circuit for the data recording controller 100.

The 8–16 modulation circuit 11, which performs a series of data processing including 8–16 conversion and NRZI conversion, converts 8 bits of original data to 16 bits of write data. The modulation control circuit 12 controls the data conversion of the 8–16 modulation circuit 11. The memory I/F 22 requests an external DRAM 13 to provide original data, which is subject to recording. The buffer 14 stores the original data of the DRAM 13 provided through the memory I/F 22 and provides the original data to the 8–16 modulation circuit 11. The write timing generation circuit receives an address signal ADD from an address decoder 50, detects partitions between blocks in the disc, and generates a synchronizing signal (encode synch) ES from the address signal ADD. The output circuit 16 receives write data from the 8–16 modulation circuit 11 and outputs the write data at a predetermined timing to a recording unit 60.

The counter 17 counts the conversion data of the 8–16 modulation circuit 11 in units of write data (16 bits (1 word)). The recording position register 19 receives a data value corresponding to a write starting position (record start position) and a data value corresponding to a write terminating position (record stop position) from a microprocessor (MPU) 18 and holds the data values. The trigger generation circuit 20 compares the count value of the counter 17 with the data value stored in the recording position register 19 to generate a trigger signal. The parameter register 21 holds an initial value or end value of the conversion parameter to maintain the regularity of conversions of data.

A writing ending operation and a write starting operation, which follows the writing ending operation, that are performed in the data recording controller 100 is discussed as follows. In particular, the operation of the data recording controller 100 from when the writing process is started to when the writing ending operation is performed due to an interruption of the writing process will now be discussed. It is assumed here the MPU 18 generates a recording operation termination command when data is written to the period corresponding to an Nth block.

Figures 3A, 3L:
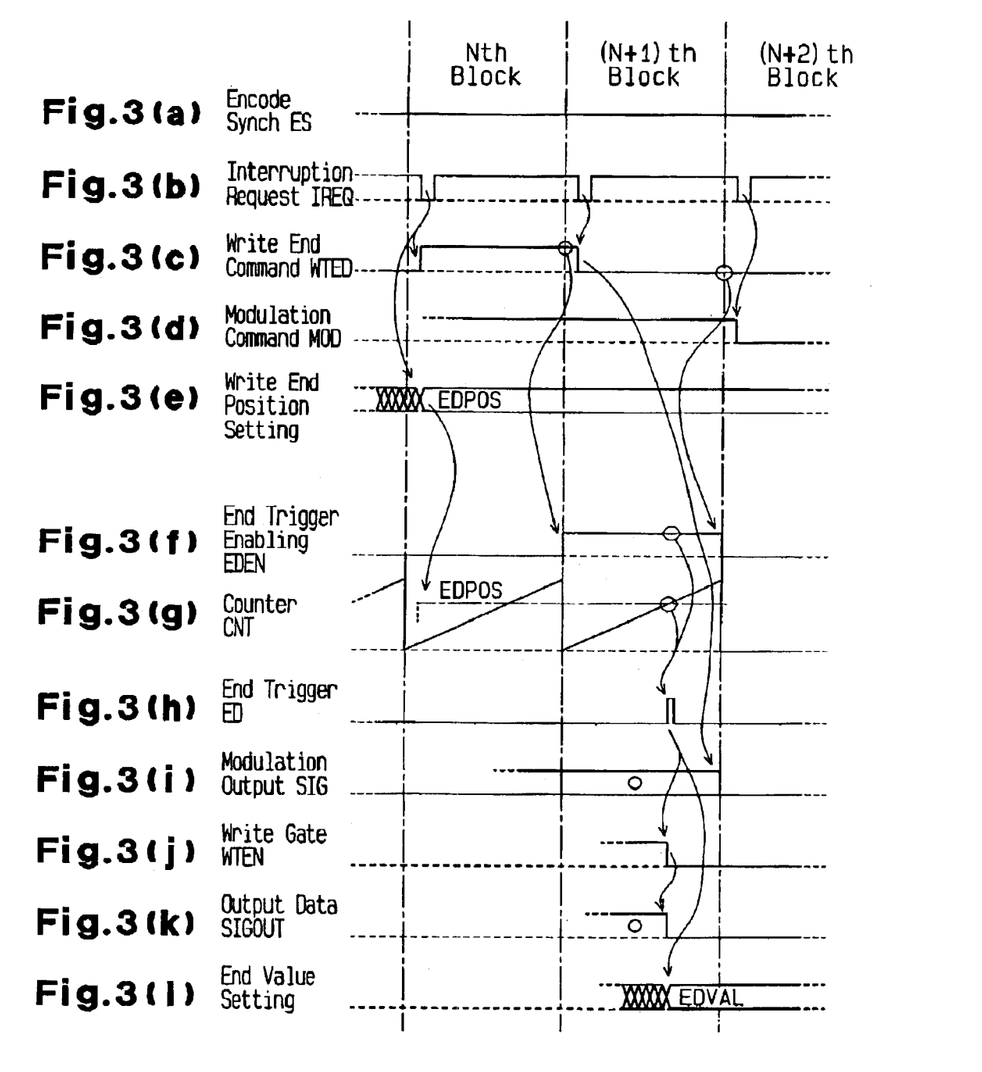

The write timing generation circuit 15 receives the address signal ADD from the address decoder 50 and generates the encode synch ES (FIG. 3(a)). The encode synch ES, which is generated cyclically in units of blocks, is a basic synchronizing signal used for processing in the data recording controller 100 and is provided to the modulation control circuit 12 and the counter 17. In response to the encode synch ES, the modulation control circuit 12 provides the MPU 18 with an interruption request IREQ during the period corresponding to the Nth block (FIG. 3(b)). The counter 17 resets the count value in synchronism with the encode synch ES (FIG. 3(g)).

During the period corresponding to the Nth block, the MPU 18 causes a write end command signal WTED, which is provided from the modulation control circuit 12 to go high in response to the interruption request IREQ (FIG. 3(c)). For example, when a computer system (not shown) sends an ending request to the DVD recorder to stop the data write operation of the DVD recorder, the write end command signal WTED goes high. In response to the next interruption request IREQ, the MPU 18 causes the write end command signal WTED to go low (FIGS. 3(b) and 3(c)).

The MPU 18 provides the recording position register 19 with a data value EDPOS, which corresponds to a write termination position, when the write end command signal WTED goes high (FIG. 3(e)). The data value EDPOS corresponding to the write ending position of the recording position register 19 is set in accordance with the position at which the write operation ends.

In response to the write end command signal WTED, the modulation control circuit 12 stops sending a data reading request to the buffer 14. When the data reading request is stopped, the buffer 14 stops sending a data transmission request to the DRAM 13. The buffer 14 provides the 8–16 modulation circuit 11 with last data provided from the DRAM 13 in response to the data transmission request before stopping. The reading of data from the DRAM 13 is performed in units of blocks. Thus, the buffer 14 continues to function until the reading of a block of data is completed.

When data is being provided to the 8–16 modulation circuit 11, the 8–16 modulation circuit 11 outputs 16 bits of modulated data SIG, and a write gate signal WTEN is high (FIGS. 3(i) and 3(j)). Thus, the output circuit 16 continues to generate output data SIGOUT (FIG. 3 (k)).

When the write end command signal WTED from the MPU 18 is high during a period corresponding to an (N+1)th block started by the next end code synch ES, the modulation control circuit 12 causes an ending trigger enable signal EDEN, which enables an ending trigger of the data writing process, to go high in synchronism with the encode synch ES (FIGS. 3(c) and 3(f)). After being reset by the encode synch ES, the counter 17 sequentially increments the count value CNT until reaching the data value EDPOS set in the period corresponding to the Nth block (FIG. 3(g)). In this state, the ending trigger enable signal EDEN is high. Thus, the trigger generation circuit 20 causes an ending trigger signal ED, which ends the writing of data, to go high (FIG. 3(h)). In response to the ending trigger signal ED, the 8–16 modulation circuit 11 writes the present data conversion parameter as an end value EDVAL to the parameter register 21 (FIG. 3(l)). The end value EDVAL stored in parameter register 21 is provided to the MPU 18 at a timing in which the interruption request IREQ is output from the modulation control circuit 12 in the period corresponding to the next block. In synchronism with the rising of the ending trigger signal ED, the counter 17 holds a present count value LCNT in a predetermined section. The count value LCNT is provided to the MPU 18 at the same timing as the end value EDVAL.

The MPU 18 compares the count value LCNT and the data value EDPOS to confirm that the desired data section has been properly written. That is, the count value LCNT indicates up to where data has been modulated and output. Further, the count value is used as a value that designates a write starting position when starting data writing continuously from a position where the writing of data is stopped.

In synchronism with the rising of the ending trigger signal ED, the write timing generation circuit 15 causes the write gate signal WTEN to go low (FIG. 3(j)). In response to the write gate signal WTEN, the output circuit 16 stops outputting the 16 bits of modulated data SIG, which is provided from the 8–16 modulation circuit 11 (FIG. 3(k)). The, the MPU 18 causes the modulation command signal MOD to go low in response to an interruption request IREQ (FIG. 3(d)). In this manner, in synchronism with the timing at which the generation of the output data SIGOUT is stopped, the conversion parameter at the point when writing is ended is stored as the end value EDVAL in the parameter register 21, and the count value LCNT indicating the write ending position (EDPOS) is provided to the MPU 18.

For example, when the write ending position is designated as the Ath word from the head of a block, the value EDPOS is set to "A" in accordance with the count unit (word) of the counter 17. The value EDPOS and the unit of the counter 17 do not necessarily have to be words. For example, the counter 17 may increment the count value in units of sectors or frames. In this case, the value EDPOS may also be set in units of sectors or frames. This enables the designation of the write ending position in units of sectors or frames.

The operation of the data recording controller 100 when starting writing subsequent to the write ending process will now be discussed.

Figures 4A, 4L:
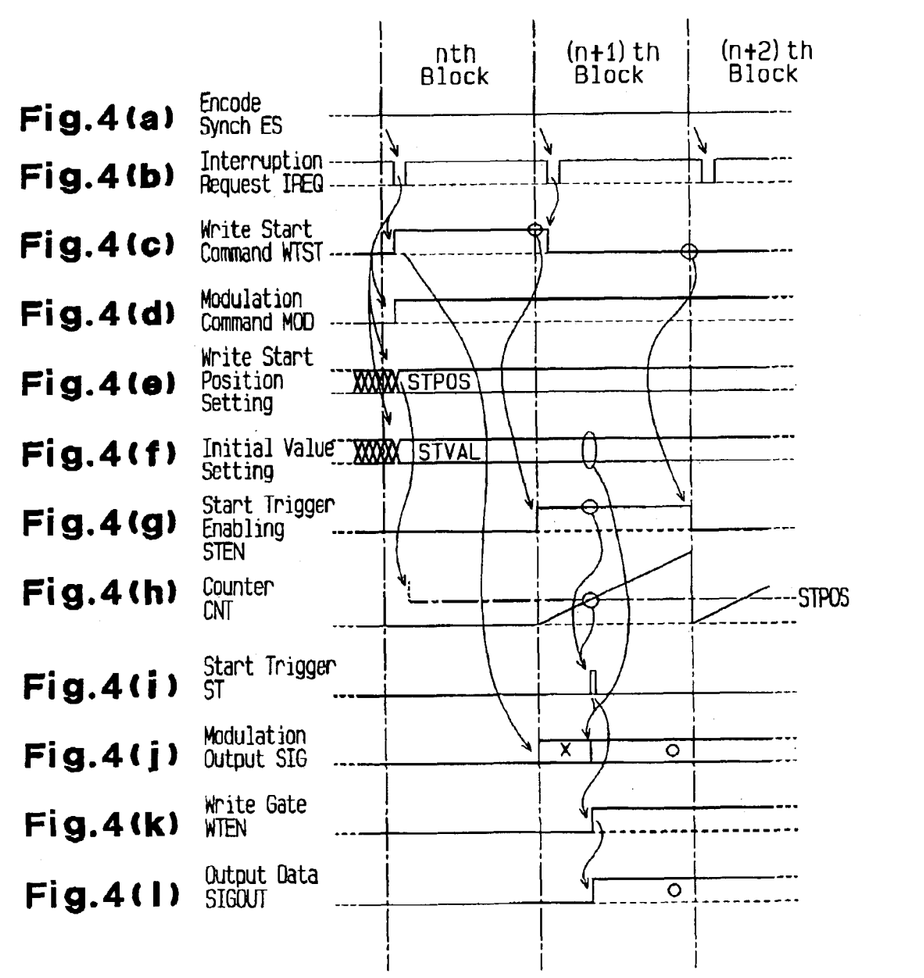

In response to the encode synch ES during the period corresponding to the nth block at which data recording is started, the modulation control circuit 12 issues an interruption request IREQ for the MPU 18 (FIGS. 4(a) and 4(b)). In response to the interruption request IREQ, the MPU 18 causes a write start command signal WTST, which is provided to the modulation control circuit 12, to go high (FIG. 4(c)). For example, the write start command signal WTST is high when the computer system (not shown) requests the DVD recorder to start data recording. The MPU 18 causes the write start command signal WTST to go low in response to the next interruption request IREQ (FIGS. 4(b) and 4(c)).

The modulation control circuit 12 instructs the buffer 14 to read data in response to the write start command signal WTST. The buffer 14 sends a data transmission request to the DRAM 13 via a memory I/F 22 in response to the data read instruction. The buffer 14 stores the string of 8 bits of data read from the DRAM 13. When the stored data reaches a predetermined amount, the buffer 14 transmits a signal to the modulation control circuit 12 for notification that the data has reached the predetermined amount. In response to the transmitted signal, the modulation control circuit 12 provides the 8–16 modulation circuit 11 with a signal BUFEN, which indicates that a sufficient amount of data has been stored in the buffer 14. The MPU 18 provides the modulation control circuit 12 with the write start command signal WTST and a modulation command signal MOD (FIG. 4(d)).

The MPU 18 further provides the recording position register 19 with a value STPOS corresponding to the write start position and the parameter register 21 with an initial value STVAL (FIGS. 4(e) and 4(f)).

The value STPOS corresponding to the write start position is set in accordance with a data position where the adding operation is started. Further, the count value LCNT (EDPOS), which indicates the write end position, is used as the value STPOS. For example when the write start position is the Ath word from the head of a block, the value STPOS is set to "A". The value STPOS and the count unit of the counter 17 do not necessarily have to be in units of words and may be in units of sectors or frames.

The initial value STVAL stored in the parameter register 21 is the value of the conversion parameter obtained when the conversion process of the final data is performed in the preceding write operation. The end value EDVAL is used as the STVAL.

Then, at the synchronizing timing of the encode synch during the period corresponding to the (n+1)th block, when the modulation command signal MOD goes high, the 8–16 modulation circuit 11 sequentially performs modulation on the 8 bits of data to sequentially generate 16 bits (1 word) of modulated data SIG (FIG. 4(j)). However, the conversion parameter used when starting data conversion may not be in accordance with the regularity of the conversions used for the preceding conversion parameter. Thus, the write data obtained through data conversion may not be appropriate (as denoted by "x" in FIG. 4(j)). When the write start command signal WTST provided from the MPU 18 goes high, the modulation control circuit 12 causes the start trigger enable signal STEN, which enables a start trigger of the data write process, to go high in synchronism with the encode synch (FIGS. 4(c) and 4(g)).

At the same time as when the 8–16 modulation circuit 11 starts modulation, the counter 17 starts incrementing the count value CNT in synchronism with the encode synch ES (FIG. 4(h)). The counter 17 counts the output of the 8–16 modulation circuit 11 and sequentially increments the count value CNT until the count value CNT reaches to the value STPOS, which is set during the period corresponding to the nth block by the MPU 18. In this state, when the start trigger enable signal STEN is high, the trigger generation circuit 20 causes a data write start trigger signal ST to go high (FIG. 4 (i)). In response to the start trigger ST, the 8–16 modulation circuit 11 reads an initial value from the parameter register 21 and sets the initial value as the conversion parameter. At this timing, the STVAL, which is stored by the MPU 18 during the period corresponding to the previous nth block, is stored as an initial value of the conversion parameter to maintain the conversion regularity used in the preceding write operation. Accordingly, subsequent data conversion is performed in a state in which the conversion regularity from the previous write operation is maintained (FIGS. 4(f), 4(i), and as denoted by "○" in FIG. 4(j)). When the start trigger ST goes high, the write timing generation circuit 15 causes the write gate signal WTEN to go high (FIGS. 4(i) and 4(k)). When the write gate signal WTEN goes high, the output circuit 16 outputs the 16 bits of modulation output SIG, which is sent from the 8–16 modulation circuit 11, as the output data SIGOUT (FIGS. 4(k) and 4(l)).

In this manner, the 8–16 modulation circuit 11 reads the STVAL from the parameter register 21 as an initial value in synchronism with the start trigger ST. Further, the output circuit 16 outputs only the modulated data SIG, which is generated using the initial value STVAL as a conversion parameter, as the output data SIGO.

The write end position EDPOS when the preceding operation ends and the end value EDVAL of the conversion parameter at that time point are stored. When the next write operation is started, the write end position EDPOS is provided to the data recording controller 100 as a write start position STPOS. The end value EDVAL is provided to the data recording controller 100 as the initial value STVAL of the conversion parameter. In such a manner, data is written to the DVD-R without a link section continuously from the final data of the preceding write operation while maintaining the regularity of the series of conversions.

When the section for storing the value STPOS, which corresponds to the write start position, and the section for storing the value EDPOS, which corresponds to the write end position, are provided separately in the recording position register 19, writing may be restarted in a period corresponding to some block by using the value STPOS stored in the register 19, and writing may be ended in the period corresponding to the block that is the same as the block at the time of write restarting using the value EDPOS stored in the register 19. In this case, the period corresponding to the Nth block of the preceding write operation is the same as the period corresponding to the nth block when restarting the write operation. During the period corresponding to the (n+1)th block (the period corresponding to the (n+1)th block), writing is started at a timing designated by the value STPOS, which corresponds to the write stat position. Further, the writing ends at a timing designated by the value EDPOS, which corresponds to the write end position. In this case, to properly write data, the value STPOS corresponding to the write ending position and the value EDPOS corresponding to the write end position must satisfy the relationship of STPOS<EDPOS.

The data recording controller 100 of the preferred embodiment has the advantages described below.

(1) The data recorder performs a write operation that follows the preceding write operation at an arbitrary timing without a link section on the DVD-R.

(2) The regularity of data conversions is maintained between the final data written during the preceding write operation and the head write data that will be written in the next write operation. In other words, the continuity of data at points in which portions of write data are connected is guaranteed.

(3) Since link sections are not necessary, the recording area is used efficiently.

(4) The output control of the converted data SIG generated by the 8–16 modulation circuit 11 is performed at a proper timing by the write gate signal WTEN of the write timing generation circuit 15, and the range of the output data SIGOUT designated by the MPU 18 is recorded.

(5) The MPU 18 does not have to constantly manage the write operation status. This reduces the load of the MPU 18 when writing data to the DVD-R.

It should be apparent to those skilled in the art that the present invention may be embodied in many other specific forms without departing from the spirit or scope of the invention. Particularly, it should be understood that the present invention may be embodied in the following forms.

Figure 5:
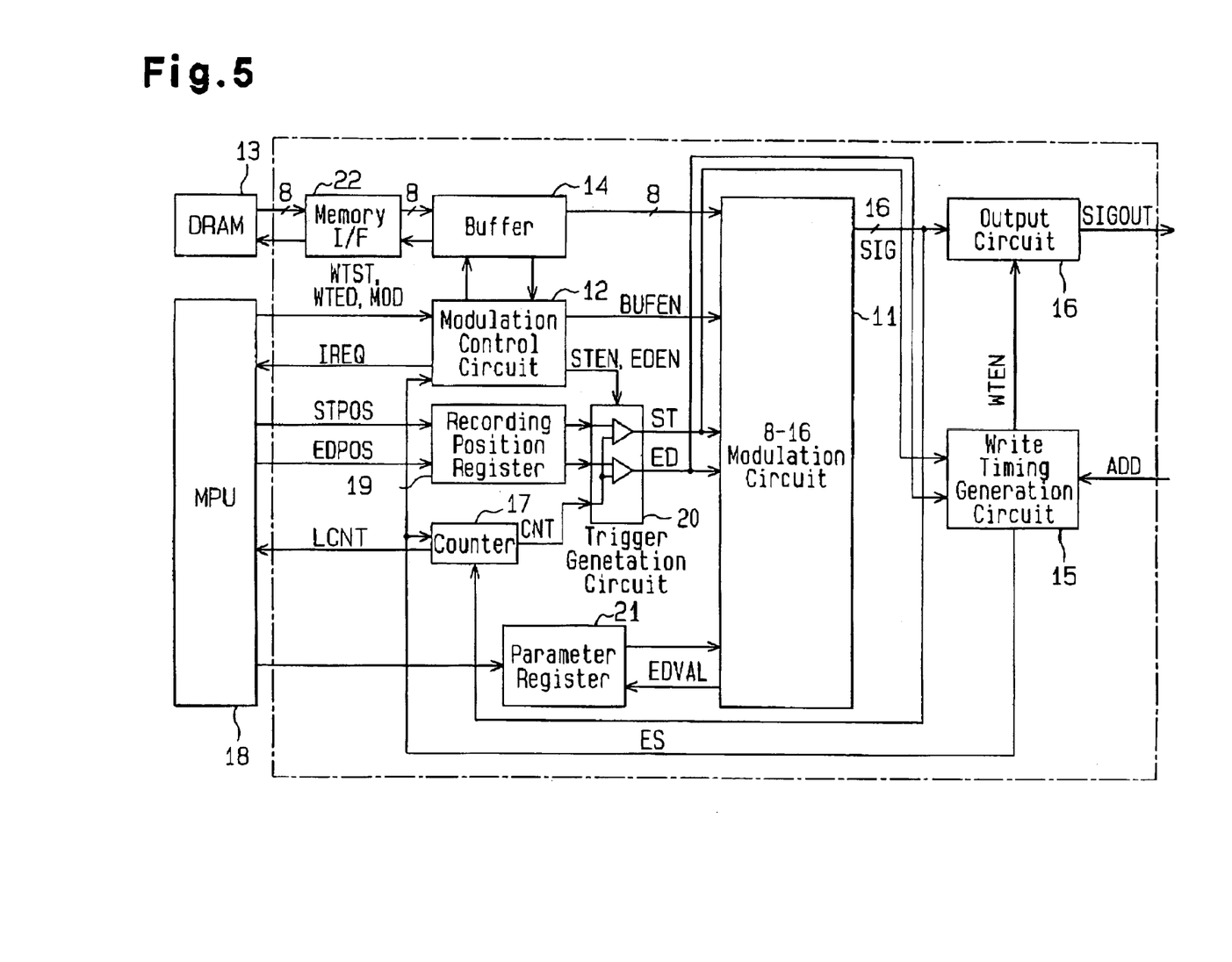
FIG. 5 is a schematic block diagram showing a modification of the data recording controller of FIG. 2.

Referring to FIG. 5, the parameter register 21 may bold the end value EDVAL written by the 8–16 modulation circuit 11 until the write operation is restarted. In this case, the MPU 18 does not have to read the end value EDVAL from the register 21 and does not have to store the end value EDVAL in the register 21 when restarting the write operation. This reduces the load on the MPU 18.

Instead of using the count value LCNT, which is transferred to the MPU 18 from the counter 17, as the value EDPOS corresponding to the write end position, the count value LCNT may be used as the value STPOS corresponding to the write start position when restarting the write operation. In this case, the MPU 18 performs the data adding operation without recognizing the position where the write operation ended. This reduces the load on the MPU 18.

The data recording controller 100 may incorporate a circuit having a function for detecting a buffer underrun in the buffer 14 and holding the generation timing of the buffer underrun. When using such a circuit, the conversion parameter is held in the parameter register 21 at a timing in which the write data is interrupted due to buffer underrun, and the held parameter is used to write the next data continuously from the position where the writing of data is interrupted. In this case, the write data is recorded properly while maintaining the continuity of the conversion regularity before and after a write interruption. A buffer underrun refers to a state in which the data provided to the 8–16 modulation circuit 11 from the buffer 14 becomes insufficient during the write operation.

The conversion parameter stored in the parameter register 21 in response to the end trigger signal ED does not have to be provided to the MPU 18. That is, the 8–16 modulation circuit 11 may receive a conversion parameter from the register 21 in synchronism with the start trigger signal STED of the next data adding operation while the parameter register 21 holds the conversion parameter. In this case, the MPU 18 does not transfer data with the parameter register 21. This reduces the load on the MPU 18.

The present invention is not limited to the DVD recorder of a DVD-R and may be applied to a data recording, controller that controls the operation of a data recorder, which converts original data to write data in accordance with a conversion parameter and writes the write data to a recording medium.

The present examples and embodiments are to be considered as illustrative and not restrictive, and the invention is not to be limited to the details given herein, but may be modified within the scope and equivalence of the appended claims.

What is claimed is:

1. A data recording controller for controlling recording operation of plural pieces of modulated data recorded on a disc medium in units of blocks, the data recording controller comprising:

a modulation circuit for modulating the data with a conversion parameter to generate modulated data while updating the conversion parameter for each piece of data;

a control circuit connected to the modulation circuit for stopping the recording operation part way through a block in response to a record stop command and for starting the recording operation from a record stop position in response to a record start command; and a parameter register connected to the modulation circuit for storing the conversion parameter of the modulated data at the time of stopping of recording operation, wherein the modulation circuit starts modulating data with the conversion parameter stored in the parameter register as an initial value when the recording operation is started.

2. The data recording controller according to claim 1, wherein the conversion parameter stored in the parameter register is read when the recording operation is stopped, and the read conversion parameter is stored in the parameter register again when the recording operation is started.

3. The data recording controller according to claim 2, wherein the control circuit includes:
 a recording position register for storing the record stop position;
 a counter connected to the modulation circuit for counting the modulated data and generating a count value; and
 a trigger generation circuit connected to the recording position register, the counter, and the modulation circuit for comparing the count value and the record stop position when starting recording operation and generating a start trigger for starting the recording operation based on the comparison, wherein the modulation circuit receives a conversion parameter from the parameter register in response to the start trigger.

4. The data recording controller according to claim 3, wherein the recording position register is externally readable and writeable register.

5. The data recording controller according to claim 3, further comprising:
 an output circuit connected to the modulation circuit and the trigger generation circuit for receiving the modulated data from the modulation circuit and outputting the modulated data to an external unit in response to the start trigger.

6. The data recording controller according to claim 5, wherein the recording position register is externally readable and writeable register.

7. The data recording controller according to claim 1, wherein the conversion parameter of the modulated data, which is stored in the parameter register at the time of stopping the recording operation, is held until the recording operation is started.

8. The data recording controller according to claim 7, wherein the control circuit includes:
 a recording position register for storing the record stop position;
 a counter connected to the modulation circuit for counting the modulated data and generating a count value; and
 a trigger generation circuit connected to the recording position register, the counter, and the modulation circuit for comparing the count value and the record stop position when starting recording and generating a start trigger for the recording operation based on the comparison, wherein the modulation circuit receives a conversion parameter from the parameter register in response to the start trigger.

9. The data recording controller according to claim 8, wherein the recording position register is externally readable and writeable register.

10. The data recording controller according to claim 8, further comprising:
 an output circuit connected to the modulation circuit and the trigger generation circuit for receiving the modulated data from the modulation circuit and outputting the modulated data to an external unit in response to the start trigger.

11. The data recording controller according to claim 10, wherein the recording position register is externally readable and writeable register.

12. A data recording controller for controlling recording operation of plural pieces of modulated data recorded on a disc medium in units of blocks, the data recording controller comprising:
 a modulation circuit for modulating the data with a conversion parameter to generate modulated data while updating the conversion parameter for each piece of data;
 a control circuit connected to the modulation circuit for stopping the recording operation part way through a block in response to a record stop command and for starting the recording operation from a record stop position in response to a record start command;
 a parameter register connected to the modulation circuit for storing the conversion parameter of the modulated data at the time of stopping the recording operation; and
 an output circuit connected to the modulation circuit for receiving the modulated data from the modulation circuit and outputting the modulated data to an external unit in response to a start trigger for data recording, wherein the modulation circuit receives the conversion parameter from the parameter register and starts modulating data with the conversion parameter as an initial value in response to the start trigger, and wherein the control circuit includes:
 a recording position register for storing the record stop position;
 a counter connected to the modulation circuit for counting the modulated data and generating a count value; and
 a trigger generation circuit connected to the recording position register, the counter, and the modulation circuit for comparing the count value and the record stop position when starting recording operation and generating the start trigger based on the comparison, wherein the conversion parameter stored in the parameter register is read when the recording operation is stopped, and the read conversion parameter of the modulated data is stored in the parameter register again when the recording operation is started.

13. A data recording controller for controlling recording operation of plural pieces of modulated data recorded on a disc medium in units of blocks, the data recording controller comprising:
 a modulation circuit for modulating the data with a conversion parameter to generate modulated data while updating the conversion parameter for each piece of data;
 a parameter register connected to the modulation circuit for storing the conversion parameter of the modulated data at the time of stopping the recording operation;
 a recording position register for storing a record stop position of the middle of the block where the recording operation is stopped;
 a counter connected to the modulation circuit for counting the modulated data and generating a count value; and
 a trigger generation circuit connected to the recording position register, the counter, and the modulation circuit for comparing the count value and the record stop position and for generating a stop trigger for data recording based on the comparison, wherein the modulation circuit stores a conversion parameter in the parameter register in response to the stop trigger.

14. The data recording controller according to claim 13, wherein the recording position register stores the record stop position as a record start position when recording operation is started, the trigger generation circuit compares the count value of the counter with the record start position and generates a start trigger for data recording based on the comparison, and the modulation circuit receives the conversion parameter from the parameter register and starts modulating data with the conversion parameter as an initial value in response to the start trigger.

15. The data recording controller according to claim 14, wherein the data recording position register has a first section for storing the record stop position and a second section for storing the record start position.

16. A method for controlling recording operation of plural pieces of modulated data recorded on a disc medium in units of blocks, the method comprising:

> modulating data with a conversion parameter to generate modulated data while updating the conversion parameter for each piece of data;
>
> stopping recording operation part way through a block in response to a record stop command;
>
> storing the conversion parameter of the modulated data at the time of stopping the recording operation;
>
> starting the modulation of the data with the stored conversion parameter as an initial value in response to a record start command; and
>
> starting the recording operation from a record stop position.

17. A method for controlling recording operation of plural pieces of modulated data recorded on a disc medium in units of blocks, the method comprising:

> modulating data with a conversion parameter to generate modulated data while updating the conversion parameter for each piece of data;
>
> counting the modulated data to generate a count value;
>
> storing a record stop position part way through a block;
>
> comparing the count value and the record stop position to generate a stop trigger of the recording operation based on the comparison; and
>
> storing the conversion parameter of the modulated data at the time of stopping the recording operation in response to the stop trigger.

* * * * *